United States Patent [19]

Johnston et al.

[11] 4,066,304

[45] Jan. 3, 1978

[54] BEARING CAGE

[75] Inventors: Gordon Boyd Johnston, Beesd, Netherlands; Reinhart Michael Hillmann; Helmuth Martin Kregler, both of Schweinfurt, Germany; Bertil Sven Janson; Hasse Eivind Strandberg, both of Gothenburg, Sweden

[73] Assignee: SKF Industrial Trading and Development Company B.V., Nieuwegein, Netherlands

[21] Appl. No.: 693,602

[22] Filed: June 7, 1976

Related U.S. Application Data

[63] Continuation of Ser. No. 506,617, Sept. 16, 1974, abandoned.

[30] Foreign Application Priority Data

Sept. 9, 1973   Netherlands .......................... 7312876

[51] Int. Cl.² ............................................. F16C 33/46
[52] U.S. Cl. .................................................... 308/201
[58] Field of Search ........................ 308/201, 217, 218

[56] References Cited

U.S. PATENT DOCUMENTS

| 1,168,937 | 1/1916 | Eitner | 308/201 |
| 1,699,325 | 1/1929 | Dake | 308/201 |
| 2,146,440 | 2/1939 | Pew | 308/201 |
| 2,712,481 | 7/1955 | Martin | 308/201 |
| 3,429,626 | 2/1969 | Teutel | 308/201 |
| 3,758,180 | 9/1973 | Asberg | 308/201 |

Primary Examiner—Richard A. Bertsch
Attorney, Agent, or Firm—Daniel M. Rosen

[57] ABSTRACT

A bearing cage for use in a bearing having inner and outer rings, a plurality of balls arranged in two axially spaced rows between the rings, and a cage for separating the balls, the cage being dimensioned to permit relative motion between the rows of rolling elements, or between the rolling elements in their respective rows.

22 Claims, 6 Drawing Figures

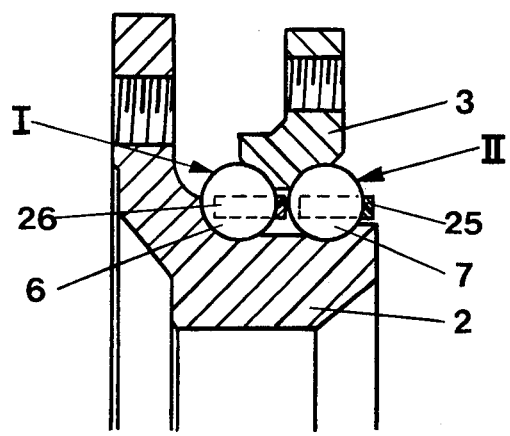
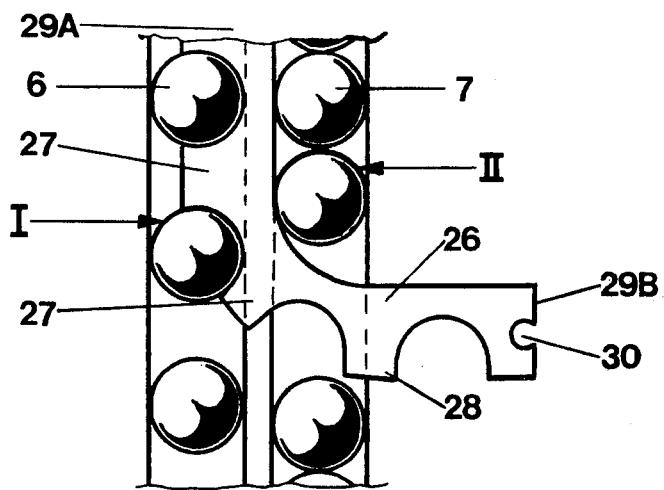

BEARING CAGE

This is a continuation of application Ser. No. 506,617, filed Sept. 16, 1974, now abandoned.

BACKGROUND OF THE INVENTION

The invention concerns a cage for a bearing, comprising an inner and an outer ring, which can be exposed to relatively high bending moments. Rolling elements are arranged in two rows between the rings, the said rolling elements centering the cage, which also serves to separate the rolling elements from one another, and which can be introduced from one side only between the rings of the bearing. This type of bearing cage is known in the prior art, as a bearing cage of the so-called "snap"-type, provided with an annular side-part, displaying fingers or partitions, radially extending from the side part and which are essentially in a parallel arrangement, thereby separating pairs of rolling elements.

This type of bearing cage, which is mainly used in bearings, wherein the rings form an integral part of the fastening flanges, has a relatively rigid structure, and it was found that such cages, applied to bearings of the aforementioned type and used mostly as wheel bearings in autocars, now can be exposed to high and suddenly changing bending moments. Consequently the present invention provides a bearing cage, which displays an important improvement for bearings of the afore-mentioned type.

SUMMARY OF THE INVENTION

According to the invention the bearing cage is so dimensioned that relative motions are allowed between the rows of the rolling elements and/or between the rolling elements in their respective rows. Experience proves that such arrangement permits the rotation of both rows of rolling elements at various rates when exposed to different load conditions, without excessively stressing the cage of the bearing.

According to a preferred embodiment of a bearing cage of the aforementioned type, wherein the cage-elements are axially centered by rolling elements arranged in pairs, a cage-element is characterized in that the element, when under load, can be hinged around parts, that are provided both inside and outside of the cage element. Such arrangement ensures under any conditions a flexible adjustment of the cage to changing and different load conditions; the cage structure permits certain changes in the spacing of the rolling elements from one another, without affecting the separation thereof.

According to another advantageous embodiment of the invention the bearing cage consists of two separated, annular parts, each of them centering, from one side, one row of the rolling elements, while at least one of the annular parts has a split structure and can be inserted between the rolling elements "spirally". Such arrangement advantageously permits the application of two bearing cages of an essentially simple structure, ensuring that the separation of the series of rolling elements, which are the farthest from the side of introduction and which, as a rule, are the most difficult to handle, can be realized in a simple manner. For this purpose the split annular bearing part can be introduced in spiral form between the rolling elements; more particularly, an end-part of the cage is first introduced axially between a row of rolling elements, whereafter it is inserted between both rows in tangential direction. This arrangement automatically ensures that the rolling elements are spaced-off from one another at the required distances, thereby eliminating the process of arranging first the rolling elements at the prescribed distances around the ring and then mounting the snap-cage.

The invention will now be described in detail with the reference to the attached drawings, disclosing other advantages and features thereof.

BRIEF DESCRIPTION OF THE DRAWINGS

FIG. 5 is a partial sectional view of the bearing according to FIG. 1, with split bearing cage rings;

FIG. 6 is a fragmentary plan view of a bearing cage, applied to a bearing as shown in FIG. 5, wherein a row of rolling elements is centered by a cage-part introduced "spirally".

DETAILED DESCRIPTION OF THE PREFERRED EMBODIMENTS

Figure 1:
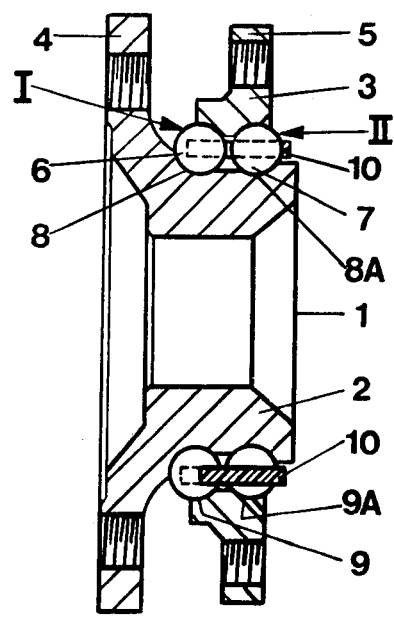
FIG. 1 is a cross-sectional view of a bearing according to the invention.

According to FIG. 1, the bearing comprises an inner ring 2 and an outer ring 3, provided with flanges 4 and 5, forming integral parts of the said rings and to which for example the hub of a wheel or the brake-mechanism of a car can be fastened. The bearing 1 comprises, in addition, two rows (I, II) of rolling elements, consisting of balls 6 and 7, respectively, fastened in running surfaces 8, 8A and 9, 9A of the inner ring 2 and outer ring 3, respectively, the rolling elements are separated from one another in the direction of rotation by a bearing cage 10.

Figure 2:
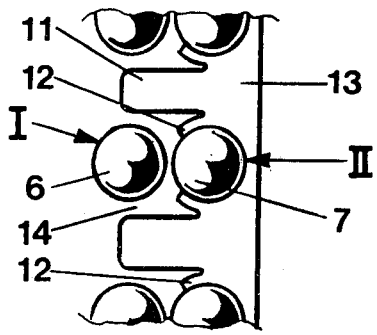
FIGS. 2, 3 and 4 are fragmentary plan views of bearing cages that can be applied to a bearing as shown in FIG. 1.
Figure 3:
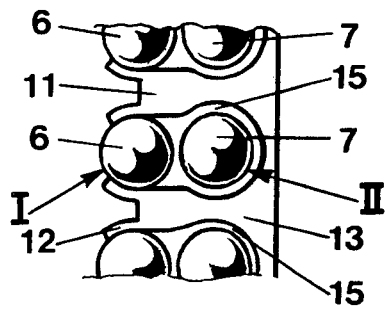
Figure 4:
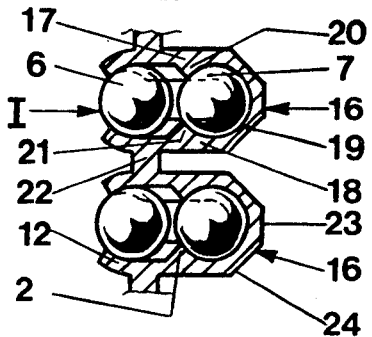

It should be pointed out, that the insertion of rolling elements or balls 6 and 7, respectively, in such bearings is effected by removing one of the bearing rings eccentrically with regard to one another, thereby providing a sickle-shaped gap, permitting the arrangement of a certain number of balls between the inner and outer ring. Thereafter the rings are centered, thereby distributing the balls in the running faces, and by inserting the bearing cage 10 axially between the balls, they will be centered with regard to one another. In this embodiment the balls 6 and 7 are separated in pairs as shown in FIGS. 2, 3 and 4 by means of partitions 11 while the balls are also situated in rows I and II. It is preferable to apply a snap-type bearing cage, the mounting of such bearing cage requiring some effort for fixing the snap-fingers 12 over the rolling elements or balls.

It will be evident that the bearing as shown in FIG. 1, will be exposed — at least during operation — to considerably changing loads and bending moments, which often are of a different origin than those affecting conventional roller bearings, and which involve the risk that the balls in one of the rows will rotate at a higher rate than those in the other row.

FIG. 2 shows a part of a bearing cage according to the invention, made of an amide or acetate or a similar stable synthetic material. The cage 10 comprises an annular part 13, with fingers or partitions or cage segments 11 extending therefrom, while at the base of each partition two projections or snap-fingers 12 are provided, which face one another. The snap-fingers 12 fit around the balls 7 of row II, these balls contacting the annular part 13 of the cage 10. An advantage of such arrangement is that a gap 14 is formed between the balls 6 of row I and the partitions 11, due to which the balls 6 can rotate at another rate than the balls 7, and consequently a slight change in the spacing with regard to the balls of the row II is permitted, without e.g. expelling the bearing cage 10 from the bearing under the effect of frictional and other forces, arising under the influence of speed differences.

FIG. 3 represents a bearing cage, whereby the balls 6 of row I are centered by snap-fingers 12, while the balls 7 of row II can be freely displaced through a gap 15 between the partition elements 11, the balls 7 being movable over a moderate distance in the running faces, thereby realizing the same effect as obtained by the bearing cage of FIG. 2. The advantage of the embodiments shown in FIGS. 2 and 3 consists mainly of the relatively simple and rather rigid structure of such type of bearing cages.

FIG. 4 represents a part of a bearing cage, which is made of a synthetic amide or acid material as well, mainly of a dark-coloured polyamide -6 or a glass-fibre reinforced material. However, there is no annular element in this embodiment such as is indicated in FIGS. 2 and 3 by 13; the bearing cage element or cage member 16 instead comprises legs 17 and 18, which in no-load condition are parallelly arranged. These legs, forming an integral part of element 19, also surround a rolling element of ball 7. The legs 17-18 end, in the proximity of ball-row I, in the snap-fingers 12. The rolling elements 7 of row II are separated in this embodiment of the invention by a connecting part 19 and by triangular projections or holding means 20 and 21, at the middle part of the legs 17 and 18. The rolling elements 6 in row I are essentially separated by the snap-fingers 12 and the legs 17 and 18. As shown the cage members 16 are joined by junction members 19, each cage member defining a generally U-shaped recess having walls forming sides and opposite closed and open ends. Each recess has breadth in the circumferential direction and depth between said ends in a transverse direction to said breadth.

An advantage of this arrangement is that the projections 20 and 21 are spaced from the fingers 12 to such an extent that, upon the bearing being in disassembled state, the balls 6 can be removed freely in axial direction over a given distance. Due to such arrangement the cage element 16, which is not annular and does not form an integral part of a closed cage ring as in FIGS. 2 and 3, can, when under load, be hinged around a rolling element and flexibly be adjusted to the variable loads to which the rolling elements 6 and 7 are exposed. These elements in fact are able to adopt small differences in distance between themselves. This effect can be intensified by the connecting elements 22 arranged in the proximity of the snap-fingers, which interconnect the cage-elements 17 and permit the rotation of the cage-elements relatively to one another around such connecting element serving as a "hinge"-point. In addition, the flexible adjustment of the bearing cage can be ensured in an optimum manner under any load conditions due to the cage element 16 being compressible. In order to promote "the snap-in" of the balls 6, 7 in the cage elements 16, the part 19 surrounding the ball 7 is provided with pressure or fitting surfaces 23, 24, to which a mounting tool can be applied in order to insert the cage in the bearing.

The embodiment, wherein the connecting element 19 of the cage element 16, together with the triangular projections 20, 21, forming a part of the element 19, surround a half or three-quarter of the periphery of a rolling element, offers the advantage of a safely operating bearing construction.

FIG. 5 represents a bearing, comprising a bearing cage according to the invention, consisting of two separate annular cage parts 25, 26, each of which separates a row of rolling elements 7 and 6, respectively. In this embodiment the cage 26 forms a ring with partitions 27 (see FIG. 6), provided with snap-lips 28, with the aid of which the rolling elements in the cage 26 can be separated. According to the invention the cage 26 is manufactured in split form (see FIG. 6), whereby the split ends 29A and 29B can be fitted together after the assembly of the cage 26.

An advantage of this structure is that the cages are simple to manufacture. Such a cage also ensures that the rolling elements can be slightly moved from one another in assembled state, without stressing the cage. Contrary to the cage 26, the cage 25 is made of one piece and is capable of centering the ball row II.

FIG. 6 represents on a slightly enlarged scale and schematically the insertion of the cage 26 in the bearing 1. For this purpose the cage 26 is provided with the split part 29 A, which is first introduced, upon separating the balls 6 in row I, in axial direction, between the rolling elements 7 and the rings 2 and 3, respectively, whereafter it is inserted still further, in tangential direction, between the ball rows I and II. An advantage of this positioning is that the rolling elements or balls 6 are "snapped-in" between the partitions 27 while at the same time being entrained in a rotating movement. The cage 26 is introduced in a manner described as "spirally" between the bearing rings 2 and 3 and the ball rows I and II. The split ends 29 A and 29 B can be fitted together after a complete rotation by means of a snap-construction. Such a cage 26 can also be composed of two or more separable parts, so that the spiral introduction between the rolling elements and the rows I and II can be carried out in a quick and easy way.

According to another embodiment of the invention the split cage 26 can be provided with a weakened link which functions as a kind of a hinge during the insertion of the cage. Such arrangement can be advantageous mainly in case of relatively large bearing cages. It should be understood of course, that the invention is not confined to the embodiments of a bearing cage described above. An essential feature of the various embodiments, based on the principle of the invention, is that a cage can adjust itself — under any operational conditions — to the changes in position of the rolling elements, essentially in the direction of rotation and mainly in bearings of the indicated type, while permanently being centered by the rolling elements and, on the other hand, ensuring the permanent separation of the said rolling elements.

What is claimed is:

1. In a bearing including inner and outer rings, two axially spaced first and second annular rows of balls between said rings, and a cage insertable between said rings for separating the balls, the improvement in combination therewith wherein said cage has a generally annular shape about a central axis, and is flexible and comprises a plurality of circumferentially spaced partitions and a connecting member between and connecting each two adjacent partitions forming a generally U-shaped section, each of said sections having walls which define a U-shaped recess open at one end and closed at the other end, each recess having dimensions of breadth in the circumferential direction and depth in the axial direction, and each recess containing a pair of first and second generally axially aligned balls, each of said pairs comprising one ball from each of said first and second rows of balls, and at least one pair of resilient holding means projecting from walls of each recess for holding said first ball in one of said ends of said recess in fixed position relative to said walls, said second ball situated generally at the opposite end of each recess and able to move relative to said walls in both of said breadth and depth directions.

2. A bearing according to claim 1 wherein said holding means secures said first ball in the closed end of each recess.

3. A bearing according to claim 1 wherein said holding means secures said first ball in the open end of each recess.

4. A bearing according to claim 1 wherein said holding means comprises two spaced fingers having facing wall surfaces which define a partial generally circular shape having diameter in free state slightly smaller than the diameter of said balls.

5. A bearing according to claim 1 wherein at least parts of said cage are compressible.

6. A bearing according to claim 1 wherein at least parts of said cage are bendable and operable as hinges between other parts of said cage adjacent said hinges.

7. In a bearing including inner and outer rings, two axially spaced first and second annular rows of balls between said rings, and a cage insertable between said rings for separating said balls, the improvement in combination therewith wherein said cage has a generally annular shape about a central axis, and is flexible and deformable from said annular shape and comprises a plurality of generally U-shaped cage segments spaced apart around the circumference of said cage, each segment having walls defining a generally U-shaped recess open at one end and closed at the other end, junction means between and joining each two adjacent cage segments, each recess having dimensions of breadth in said circumferential direction and depth in the axial direction, each recess containing a pair of first and second generally axially aligned balls, each of said pairs of balls comprising one ball from each of said first and second rows of balls, and at least one pair of resilient holding means projecting from walls of each recess for holding said first ball in one of said ends of said recess in fixed position relative to said walls, said second ball situated generally at the opposite end of each recess and able to move relative to said walls in only said depth direction.

8. A bearing according to claim 7 wherein each of said junction means comprises a hinge, with each of said cage segments being bendable relative to an adjacent cage segment.

9. A bearing according to claim 8 wherein said junction means join said cage segments near the open ends thereof.

10. A bearing according to claim 7 wherein said holding means extend from said walls approximately midway in the depth direction thereof.

11. A bearing according to claim 7 wherein a typical cage segment comprises a curved end part forming said closed end and generally parallel side parts forming said sides, and said holding means comprise snap-fingers at the ends of said sides remote from said closed end.

12. A bearing according to claim 7 wherein a typical cage segment comprises an end part forming said closed end, said end part having an inner surface defining a partial circle.

13. A bearing according to claim 7 wherein said cage comprises two separate annular parts, each of which separates balls of one row circumferentially, and at least one of said annular parts is split transverse of the circumference.

14. A bearing according to claim 7 further comprising a flange extending radially from at least one of said inner and outer rings.

15. A bearing according to claim 7 wherein at least part of said cage is compressible.

16. In a ball bearing including inner and outer rings having axially spaced forward and rearward parts, corresponding axially spaced front and rear annular rows of balls between said rings, and cage means between said rings for separating the balls circumferentially, the improvement in combination therewith, wherein said cage means comprises front and rear annular elements corresponding to said front and rear rows of balls, said front element being a flexible strip having two ends and a front-facing edge with a plurality of spaced ball-receiving pockets open in a front-facing direction along the length of said edge, said strip being bendable from a generally straight configuration into said annular shape with said pockets engaging and spacing circumferential balls of said first row, and said strip having an axial length of dimension "D", said rear element being removable and said rear row of balls, in the absence of said rear element, being relatively movable to provide between two adjacent rear-row balls a circumferential space of length greater than dimension "D", whereby said front element in generally straight configuration is insertable generally axially through said circumferential space and thence bendable to be urged into its annular configuration engaging and spacing said front row balls.

17. A bearing according to claim 16 wherein said front annular part is bendable into a partial spiral shape for insertion between said rings.

18. A bearing according to claim 16 wherein said front annular part comprises spaced first parts which are weaker than remaining parts, whereby said spaced parts are bendable and operable as hinges.

19. A bearing according to claim 16 wherein said front annular part comprises at least two strips positioned end-to-end for forming said annular configuration.

20. A bearing according to claim 16 further comprising snap-connection means for joining the ends of said front annular part of the cage.

21. A bearing cage for separating two first and second annular rows of balls, and comprising a flexible generally annular ring and a plurality of partitions spaced apart around the circumference of said ring and extending generally axially, said partitions having walls which define a generally U-shaped recess between each two adjacent partitions, each recess being open at one end and closed at the other end and having breadth in said circumferential direction and depth in the axial direction, and each recess containing a pair of first and second balls which are generally axially aligned, each of said pairs comprising one ball from each of said first and second rows of balls, at least one pair of resilient holding means projecting from walls of each recess for holding said first ball of said pair of balls in one of said ends of said recess fixed from movement in the breadth direction while allowing movement in the axial direction, said second ball situated generally at the opposite end of each recess and able to move relative to said walls in both of said breadth and depth directions.

22. A bearing cage for separating two annular first and second rows of balls, and formed as a generally annular member which is flexible and deformable from said annular configuration comprising a plurality of cage segments spaced apart around the circumference of said cage, each segment having walls defining a generally U-shaped recess open at one end and closed at the other end, junction means between and joining each two adjacent cage segments, each recess having dimensions of breadth in said circumferential direction and depth in the axial direction, each recess containing a pair of first and second generally axially aligned balls, each said pairs comprising one ball from each of said first and second rows of balls, and at least one pair of resilient holding means projecting from walls of each recess for holding said first ball in one of said ends of said recess in fixed position relative to said walls, said second ball situated generally at the opposite end of each recess and able to move relative to said walls in only said depth direction.

* * * * *

UNITED STATES PATENT AND TRADEMARK OFFICE
CERTIFICATE OF CORRECTION

PATENT NO. : 4,066,304
DATED : January 3, 1978
INVENTOR(S) : Gordon Boyd Johnston, et al It is certified that error appears in the above-identified patent and that said Letters Patent are hereby corrected as shown below:

Title page, section on Inventors change " Bertil Sven Janson; Hasse Eivind Strandberg, both of Gothenberg, Sweden" to --Bertil Sven Janson, Gothenberg; Hasse Eivind Strandberg, Floda, Sweden--.

Column 4, line 46 after "understood" insert --,--.

Signed and Sealed this

Sixth Day of June 1978

[SEAL]

Attest:

RUTH C. MASON
Attesting Officer

DONALD W. BANNER
Commissioner of Patents and Trademarks